US011934402B2

(12) United States Patent
Ramasamy et al.

(10) Patent No.: US 11,934,402 B2
(45) Date of Patent: Mar. 19, 2024

(54) SYSTEM AND METHOD FOR GENERATING OPTIMIZED DATA QUERIES TO IMPROVE HARDWARE EFFICIENCY AND UTILIZATION

(71) Applicant: BANK OF AMERICA CORPORATION, Charlotte, NC (US)

(72) Inventors: Suki Ramasamy, Tamil Nadu (IN); Satish Reddy Andela, Telangana (IN); Venkatarao Gorantla, Telangana (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/396,026

(22) Filed: Aug. 6, 2021

(65) Prior Publication Data

US 2023/0037564 A1 Feb. 9, 2023

(51) Int. Cl.
*G06F 16/2455* (2019.01)
*G06F 16/22* (2019.01)

(52) U.S. Cl.
CPC ........ *G06F 16/2455* (2019.01); *G06F 16/221* (2019.01)

(58) Field of Classification Search
CPC ............................ G06F 16/2455; G06F 16/221
USPC ........................................................ 707/769
See application file for complete search history.

(56) References Cited

U.S. PATENT DOCUMENTS

| 3,662,400 | A | * | 5/1972 | Geil | G06F 16/322 |
| | | | | | 715/236 |
| 5,864,840 | A | * | 1/1999 | Leung | G06F 16/24542 |
| 6,161,051 | A | * | 12/2000 | Hafemann | G06F 8/44 |
| | | | | | 700/86 |
| 6,167,406 | A | * | 12/2000 | Hoskins | G06F 16/21 |
| | | | | | 715/767 |
| 6,556,950 | B1 | * | 4/2003 | Schwenke | G05B 17/02 |
| | | | | | 700/86 |
| 6,996,557 | B1 | * | 2/2006 | Leung | G06F 16/24537 |
| 7,107,255 | B2 | * | 9/2006 | Kiernan | G06F 16/24544 |
| | | | | | 707/999.005 |
| 7,266,476 | B2 | * | 9/2007 | Coburn | G05B 23/0216 |
| | | | | | 700/86 |
| 7,464,089 | B2 | * | 12/2008 | Oh | G06F 16/90344 |
| | | | | | 707/E17.042 |
| 8,209,481 | B2 | * | 6/2012 | Lapir | G06F 16/90339 |
| | | | | | 707/769 |

(Continued)

*Primary Examiner* — Hanh B Thai
(74) *Attorney, Agent, or Firm* — Moore & Van Allen PLLC; Nicholas C. Russell

(57) ABSTRACT

Various systems, methods, and computer program products are provided for optimizing database querying. The method includes receiving a search request to perform a search operation associated with a database. The search request includes one or more search values. The method also includes identifying one or more search columns of the database based on at least one of the one or more search values. The identification of the one or more search columns includes comparing the at least one of the one or more search values with a reference matrix. The reference matrix relates to contents of the database. The method further includes updating the search request based on the one or more search columns identified. The method still further includes causing a transmission of the updated search request for performance of the search operation.

20 Claims, 7 Drawing Sheets

(56) References Cited

U.S. PATENT DOCUMENTS

| | | | |
|---|---|---|---|
| 8,244,046 B2 * | 8/2012 | Takahashi | G06F 16/90344 382/229 |
| 8,301,637 B2 * | 10/2012 | Otsuki | G06F 16/313 707/748 |
| 8,375,021 B2 * | 2/2013 | Sokolan | G06F 16/951 707/711 |
| 8,468,244 B2 * | 6/2013 | Redlich | G06Q 50/18 715/255 |
| 8,554,761 B1 * | 10/2013 | Ahmed | G06F 16/24537 707/802 |
| 9,002,934 B1 | 4/2015 | Lunenfeld | |
| 9,003,054 B2 * | 4/2015 | Lee | H03M 7/3066 707/718 |
| 9,235,725 B2 | 1/2016 | Spalka et al. | |
| 9,436,689 B2 | 9/2016 | Pereira et al. | |
| 9,613,166 B2 | 4/2017 | Lightner et al. | |
| 9,710,523 B2 | 7/2017 | Skurtovich, Jr. et al. | |
| 9,760,620 B2 | 9/2017 | Nachnani et al. | |
| 9,916,349 B2 | 3/2018 | Bolivar | |
| 10,223,668 B2 | 3/2019 | Schwartz | |
| 10,235,465 B2 | 3/2019 | Rodriguez | |
| 10,496,722 B2 | 12/2019 | Bobick et al. | |
| 10,528,615 B2 | 1/2020 | Chittar et al. | |
| 10,740,342 B2 | 8/2020 | Yousaf et al. | |
| 10,860,725 B2 | 12/2020 | Conway | |
| 10,909,150 B2 * | 2/2021 | Chapman | G06F 16/313 |
| 10,922,374 B1 * | 2/2021 | Hooshmand | G06F 16/9536 |
| 11,126,654 B1 | 9/2021 | Pereira et al. | |
| 11,194,775 B2 | 12/2021 | Mishra et al. | |
| 11,392,661 B2 | 7/2022 | Libin et al. | |
| 2004/0205473 A1 * | 10/2004 | Fisher | H04L 63/083 715/255 |
| 2005/0193015 A1 * | 9/2005 | Logston | G06F 16/44 |
| 2005/0289182 A1 * | 12/2005 | Pandian | G06Q 10/10 |
| 2006/0282424 A1 * | 12/2006 | Larson | G06F 16/24535 |
| 2007/0061287 A1 * | 3/2007 | Le | G06F 16/24539 |
| 2007/0073660 A1 * | 3/2007 | Quinlan | H04L 63/123 |
| 2007/0136237 A1 * | 6/2007 | Barker | G06F 21/6227 |
| 2007/0219952 A1 * | 9/2007 | Ahmed | G06F 16/24537 |
| 2009/0030898 A1 * | 1/2009 | Otsuki | G06F 16/313 707/999.005 |
| 2009/0037462 A1 * | 2/2009 | Pearson | G06F 16/213 |
| 2009/0112889 A1 * | 4/2009 | Lee | H04L 49/90 |
| 2009/0177621 A1 * | 7/2009 | Le | G06F 16/2453 |
| 2010/0332479 A1 * | 12/2010 | Prahlad | G06Q 30/02 707/E17.069 |
| 2011/0258225 A1 * | 10/2011 | Taylor | G06F 16/2272 707/769 |
| 2011/0264646 A1 * | 10/2011 | Sokolan | G06F 16/22 707/711 |
| 2011/0265177 A1 * | 10/2011 | Sokolan | G06F 16/248 726/19 |
| 2012/0005234 A1 * | 1/2012 | Tago | G06F 16/322 707/E17.012 |
| 2012/0011131 A1 * | 1/2012 | Lapir | G06F 16/332 707/E17.069 |
| 2013/0304761 A1 * | 11/2013 | Redlich | G06F 16/21 707/781 |
| 2015/0120687 A1 * | 4/2015 | Bhattacharjee | G06F 16/2343 707/704 |
| 2016/0306847 A1 * | 10/2016 | Ding | G06F 8/443 |
| 2018/0314762 A1 | 11/2018 | Rathod | |
| 2019/0325399 A1 | 10/2019 | Obeid | |
| 2020/0133693 A1 * | 4/2020 | Rohde | G06F 3/167 |
| 2020/0320072 A1 * | 10/2020 | Hormati | G06Q 30/0201 |
| 2021/0004369 A1 | 1/2021 | Jones et al. | |
| 2021/0019318 A1 * | 1/2021 | Leung | G06F 16/2393 |
| 2021/0042265 A1 * | 2/2021 | Bowman | G06F 9/5072 |
| 2021/0173851 A1 * | 6/2021 | Dorne | G06F 16/9532 |
| 2021/0256833 A1 * | 8/2021 | Daoura | H04W 4/021 |
| 2021/0345007 A1 | 11/2021 | Poniatowski et al. | |
| 2021/0390467 A1 * | 12/2021 | Ogrinz | G06F 16/285 |
| 2021/0397631 A1 * | 12/2021 | Rout | G06F 16/288 |
| 2021/0406218 A1 * | 12/2021 | Margolin | G06N 3/08 |
| 2022/0156340 A1 * | 5/2022 | Li | G06F 16/90335 |

* cited by examiner

SYSTEM AND METHOD FOR GENERATING OPTIMIZED DATA QUERIES TO IMPROVE HARDWARE EFFICIENCY AND UTILIZATION

TECHNOLOGICAL FIELD

An example embodiment relates generally to streamlining database searching, and more particularly, to reducing the number of columns to be searched during a search operation.

BACKGROUND

Database queries can be processor heavy operations in order to perform complete queries of large databases. Such queries require processing null columns in addition to relevant columns, which results in hardware inefficiency. As such, there exists a need for a system that generates optimized queries to improve hardware efficiency and utilization.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system is provided for searching a database. The search includes at least one non-transitory storage device and at least one processing device coupled to the at least one non-transitory storage device. The at least one processing device is configured to receive a search request to perform a search operation associated with a database. The search request includes one or more search values. The at least one processing device is also configured to identify one or more search columns of the database based on at least one of the one or more search values. The identification of the one or more search columns includes comparing the at least one of the one or more search values with a reference matrix. The reference matrix relates to contents of the database. The at least one processing device is further configured to update the search request based on the one or more search columns identified. The at least one processing device is still further configured to cause a transmission of the updated search request for performance of the search operation.

In various embodiments, the at least one processing device is configured to generate the reference matrix associated with the database. In various embodiments, generating the reference matrix includes identifying one or more database columns in the database. In various embodiments, identifying generating the reference matrix also includes at least one of the one or more database columns as an eminent column via a machine learning model with the at least one eminent column including one or more eminent values. In various embodiments, generating the reference matrix also includes determining if the one or more database columns comprise data corresponding to the one or more eminent values. In various embodiments, generating the reference matrix further includes building one or more entries of the reference matrix based on determining if the one or more database columns of the database includes the data corresponding to the one or more eminent values. In such an embodiment, the one or more entries of the reference matrix are based on a relationship between the one or more eminent values and the one or more database columns.

In various embodiments, the database includes one or more database columns. In such an embodiment, at least one of the database columns is an eminent column and each eminent column includes one or more eminent values. The reference matrix is based on a relationship between one or more eminent values and one or more database columns. In various embodiments, the reference matrix indicates whether a given database column contains data relating to a given eminent value. In various embodiments, the identification of the one or more search columns includes determining which of the one or more search values correspond to one or more eminent values.

In various embodiments, the database includes one or more database columns. In such an embodiment, the one or more search columns includes each of the one or more database columns that contain data relating to one of the search values. In various embodiments, the reference matrix indicates which of the one or more database columns of the database contain data relating to one of the search values. In various embodiments, updating the search request based on the one or more search columns identified includes an indication of the one or more search columns to be searched.

In another example embodiment, a computer program product is provided for searching a database. The computer program product includes at least one non-transitory computer-readable medium having computer-readable program code portions embodied therein. The computer-readable program code portions include an executable portion configured to receive a search request to perform a search operation associated with a database. The search request includes one or more search values. The computer-readable program code portions include an executable portion also configured to identify one or more search columns of the database based on at least one of the one or more search values. The identification of the one or more search columns includes comparing the at least one of the one or more search values with a reference matrix. The reference matrix relates to contents of the database. The computer-readable program code portions include an executable portion further configured to update the search request based on the one or more search columns identified. The computer-readable program code portions include an executable portion still further configured to cause a transmission of the updated search request for performance of the search operation.

In various embodiments, the computer-readable program code portions also include an executable portion configured to generate the reference matrix associated with the database. In various embodiments, generating the reference matrix includes identifying one or more database columns in the database. In various embodiments, identifying generating the reference matrix also includes at least one of the one or more database columns as an eminent column via a machine learning model with the at least one eminent column including one or more eminent values. In various embodiments, generating the reference matrix also includes determining if the one or more database columns comprise data corresponding to the one or more eminent values. In various embodiments, generating the reference matrix further includes building one or more entries of the reference matrix based on determining if the one or more database columns of the database includes the data corresponding to the one or more eminent values. In such an embodiment, the one or more entries of the reference matrix are based on a relationship between the one or more eminent values and the one or more database columns.

In various embodiments, the database includes one or more database columns. In such an embodiment, at least one of the database columns is an eminent column and each eminent column includes one or more eminent values. The reference matrix is based on a relationship between one or more eminent values and one or more database columns. In various embodiments, the reference matrix indicates whether a given database column contains data relating to a given eminent value. In various embodiments, the identification of the one or more search columns includes determining which of the one or more search values correspond to one or more eminent values.

In various embodiments, the database includes one or more database columns. In such an embodiment, the one or more search columns includes each of the one or more database columns that contain data relating to one of the search values. In various embodiments, the reference matrix indicates which of the one or more database columns of the database contain data relating to one of the search values. In various embodiments, updating the search request based on the one or more search columns identified includes an indication of the one or more search columns to be searched.

In yet another example embodiment, a computer-implemented method for searching a database is provided. The method includes receiving a search request to perform a search operation associated with a database. The search request includes one or more search values. The method also includes identifying one or more search columns of the database based on at least one of the one or more search values. The identification of the one or more search columns includes comparing the at least one of the one or more search values with a reference matrix. The reference matrix relates to contents of the database. The method further includes updating the search request based on the one or more search columns identified. The method still further includes causing a transmission of the updated search request for performance of the search operation.

In various embodiments, the method also includes generating the reference matrix associated with the database. In various embodiments, generating the reference matrix includes identifying one or more database columns in the database. In various embodiments, identifying generating the reference matrix also includes at least one of the one or more database columns as an eminent column via a machine learning model with the at least one eminent column including one or more eminent values. In various embodiments, generating the reference matrix also includes determining if the one or more database columns comprise data corresponding to the one or more eminent values. In various embodiments, generating the reference matrix further includes building one or more entries of the reference matrix based on determining if the one or more database columns of the database includes the data corresponding to the one or more eminent values. In such an embodiment, the one or more entries of the reference matrix are based on a relationship between the one or more eminent values and the one or more database columns.

In various embodiments, the database includes one or more database columns. In such an embodiment, at least one of the database columns is an eminent column and each eminent column includes one or more eminent values. The reference matrix is based on a relationship between one or more eminent values and one or more database columns. In various embodiments, the reference matrix indicates whether a given database column contains data relating to a given eminent value. In various embodiments, the identification of the one or more search columns includes determining which of the one or more search values correspond to one or more eminent values.

In various embodiments, the database includes one or more database columns. In such an embodiment, the one or more search columns includes each of the one or more database columns that contain data relating to one of the search values. In various embodiments, the reference matrix indicates which of the one or more database columns of the database contain data relating to one of the search values. In various embodiments, updating the search request based on the one or more search columns identified includes an indication of the one or more search columns to be searched.

Embodiments of the present disclosure address the above needs and/or achieve other advantages by providing apparatuses (e.g., a system, computer program product and/or other devices) and methods for dynamically generating optimized data queries to improve hardware efficiency and utilization. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
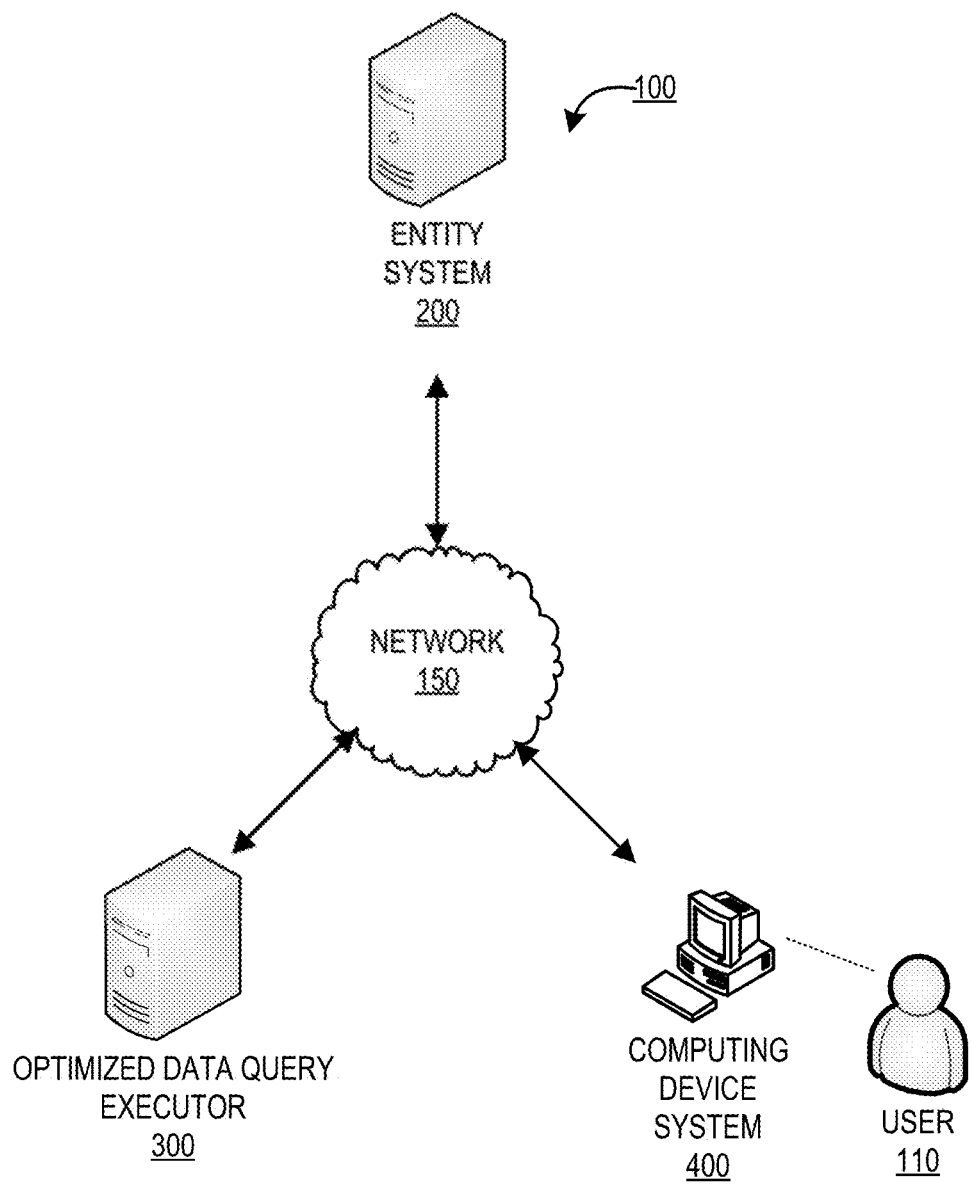
Figure 2:
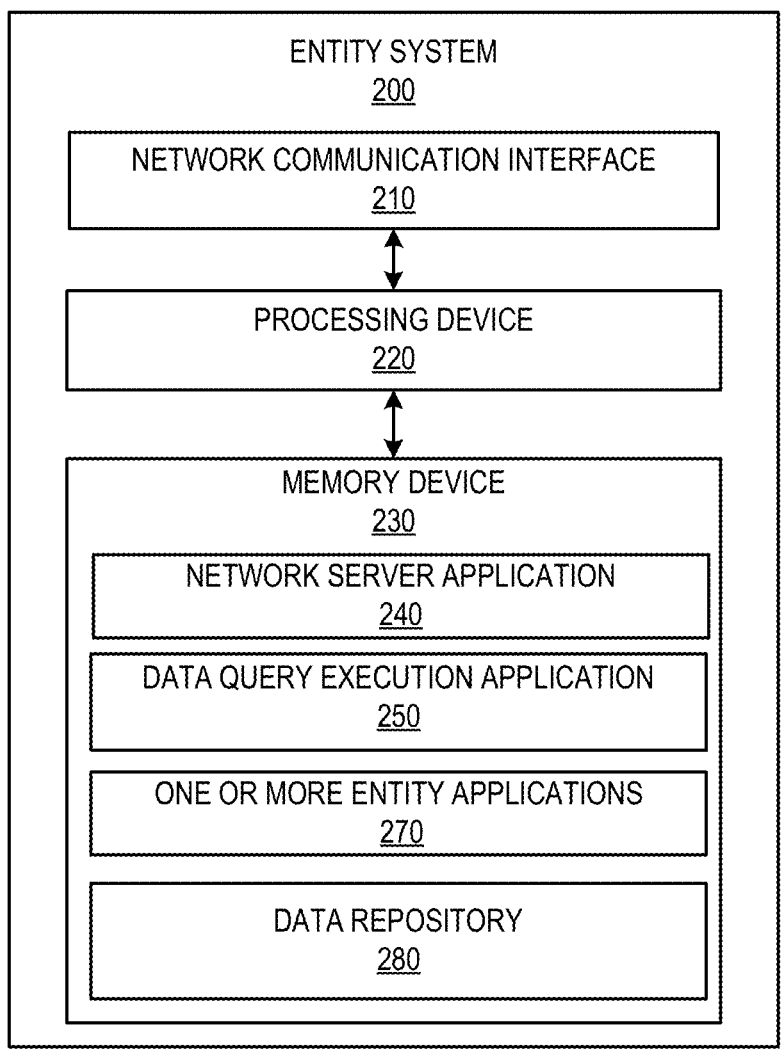
Figure 3:
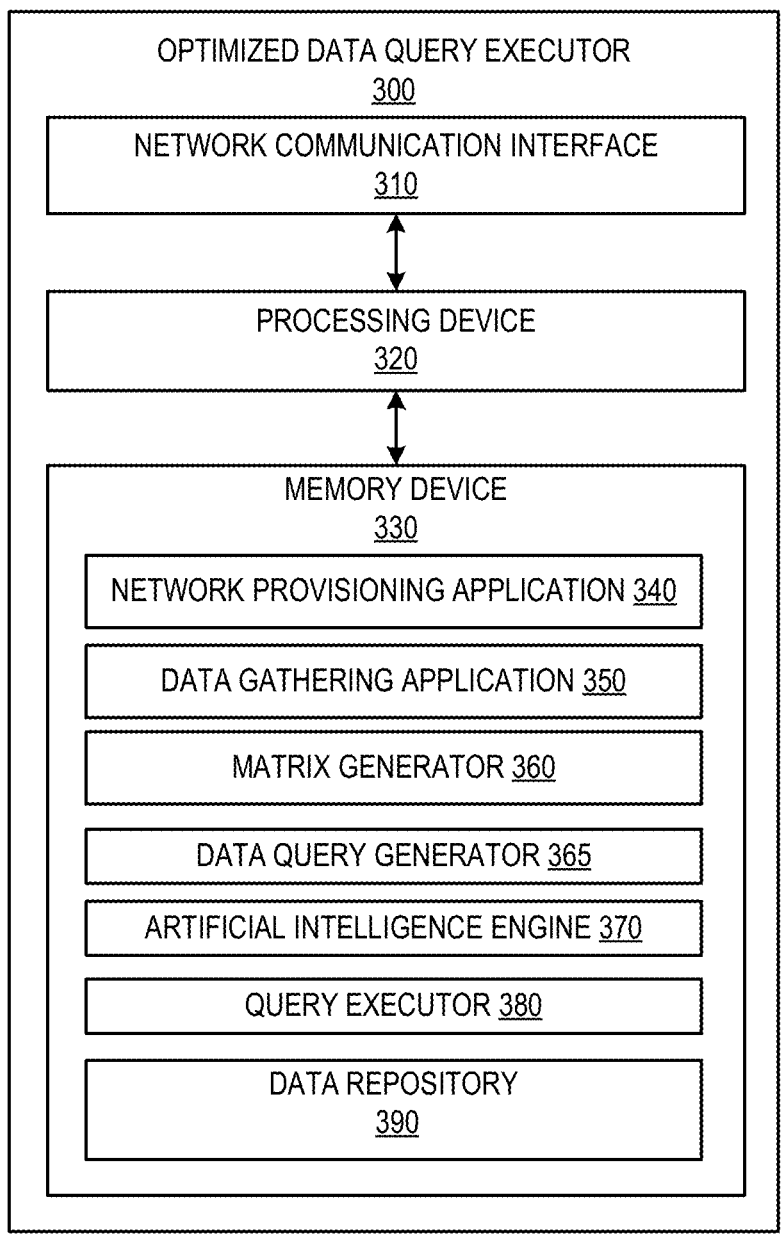
Figure 4:
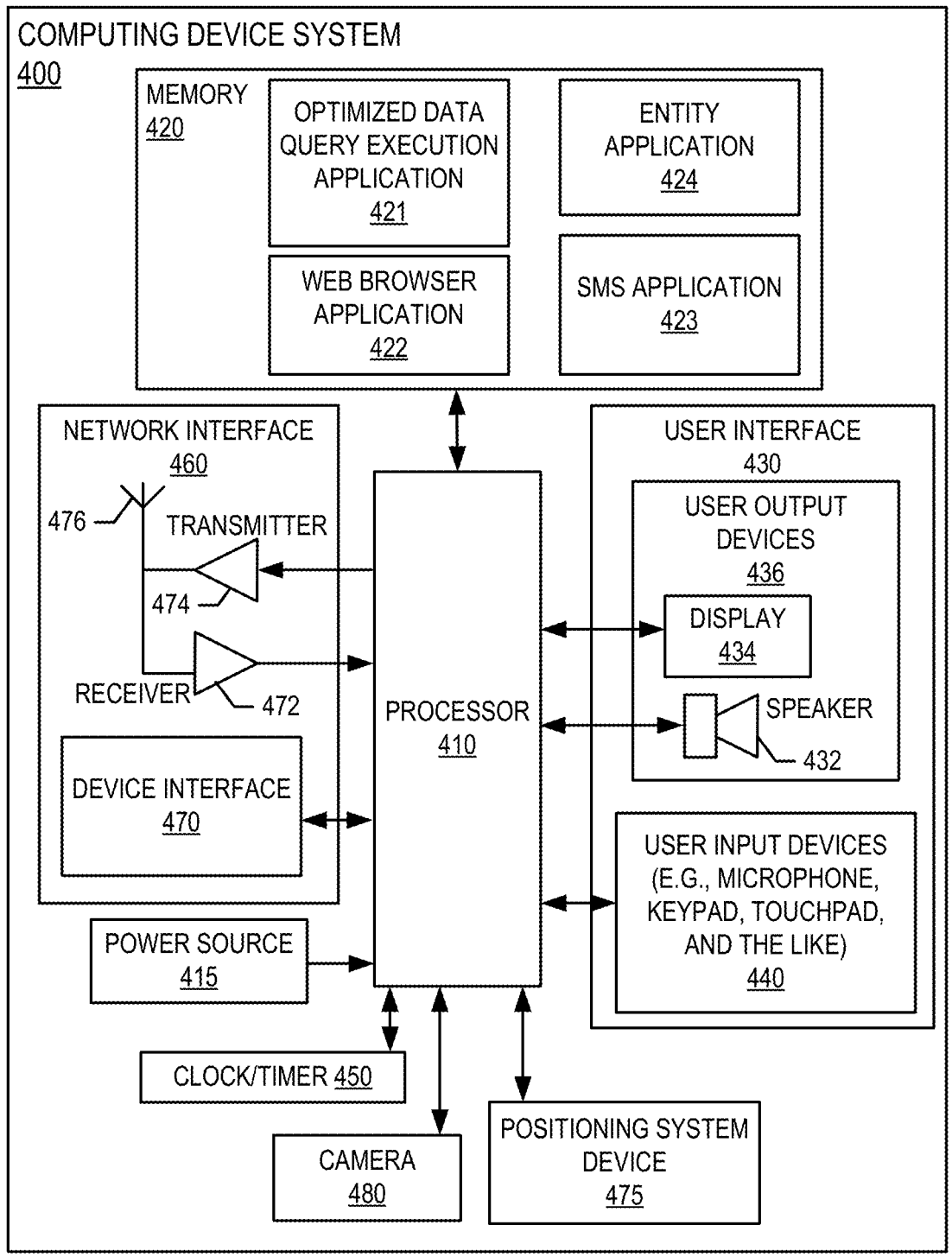
Figure 5:
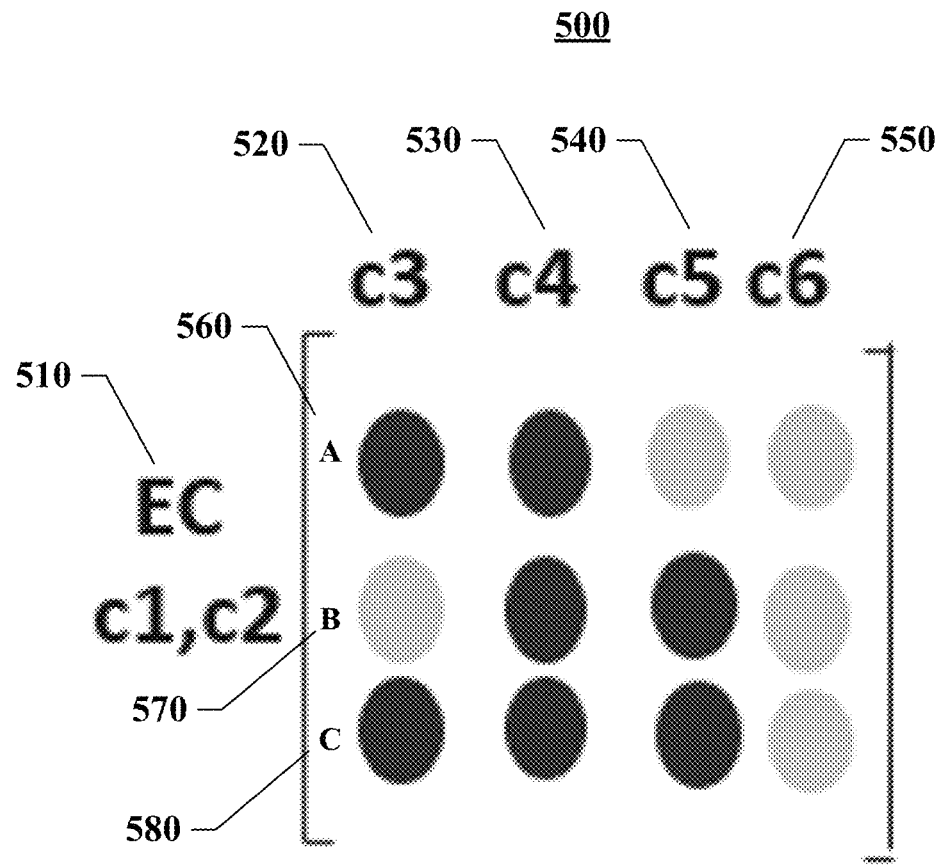
Figure 6:
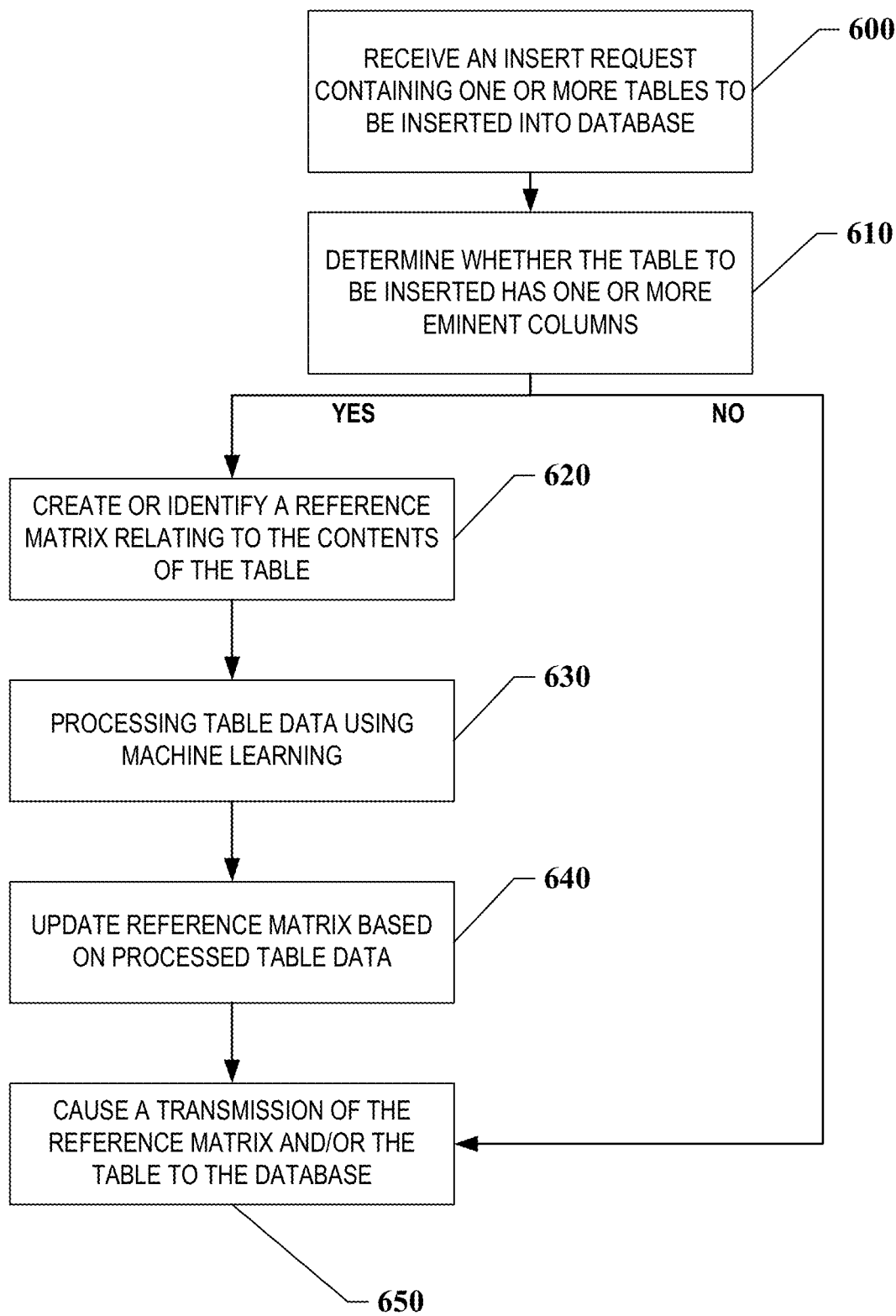
Figure 7:
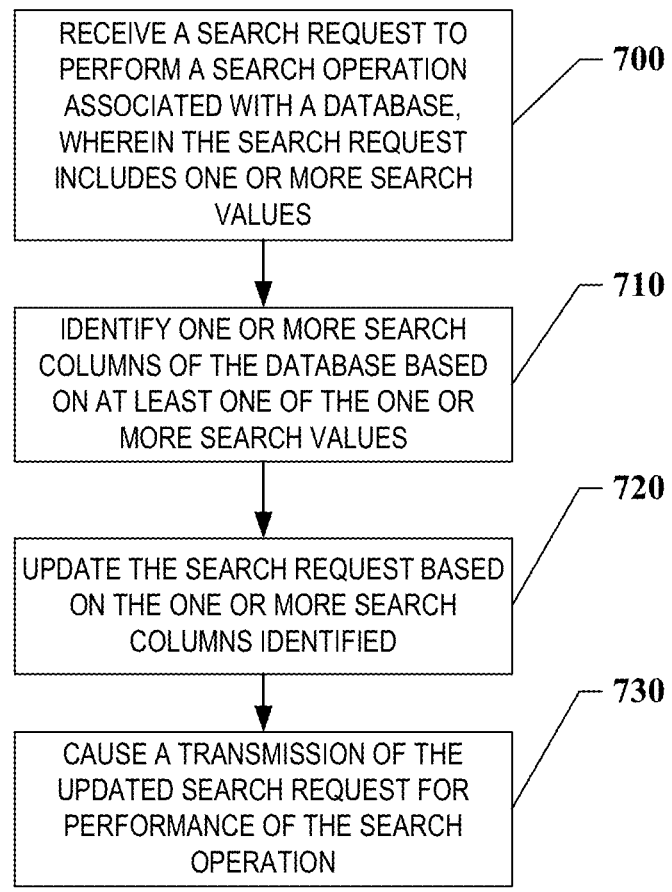

Having thus described embodiments of the disclosure in general terms, reference will now be made the accompanying drawings, wherein:

FIG. 1 provides a block diagram illustrating a system environment for dynamically generating optimized data queries to improve hardware efficiency and utilization, in accordance with embodiments of the present disclosure;

FIG. 2 provides a block diagram illustrating the entity system 200 of FIG. 1, in accordance with embodiments of the present disclosure;

FIG. 3 provides a block diagram illustrating an optimized data query executor 300 of FIG. 1, in accordance with embodiments of the present disclosure;

FIG. 4 provides a block diagram illustrating the computing device system 400 of FIG. 1, in accordance with embodiments of the present disclosure;

FIG. 5 provides a visual representation of an example reference matrix for use in accordance with embodiments of the present disclosure;

FIG. 6 provides a flowchart illustrating a method of constructing a reference matrix in accordance with embodiments of the present disclosure; and FIG. 7 provides a flowchart illustrating a method of searching a database using a reference matrix in accordance with embodiments of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Conventional systems do not have the capability to isolate null columns while processing data queries. Typically, all columns are processed irrespective of whether the columns comprise data or not, thereby decreasing hardware efficiency and utilization. As such, there exists a need for a system that generates optimized queries to improve hardware efficiency and utilization.

A table within a database can often have hundreds of columns. As such, it is very difficult to scan all of the columns of a table with the output of simple search request (e.g., a SELECT*SQL query). Often, many of the columns in the result query do not have any data relating to any of the relevant rows. The processing of unnecessary columns can be a burden on the database engine. The processing of unnecessary columns consumes large amounts of disk space, CPU capacity, time, and memory for unwanted column reads. Eliminating unnecessary columns from a query before each of the unnecessary columns are processed allows for increased efficiency. The present disclosure allows for optimized queries through the use of a reference matrix that represents NULL columns in a database relating to a given search value.

The present disclosure includes both constructing a reference matrix based on a table, and subsequently updating search requests based on a reference matrix. The reference matrix will be constructed for the value of one or more eminent columns with respect to the other columns of the table. As such, the incoming rows of a table are passed through an AI/ML model. The reference matrix is updated and/or constructed based on the data arrived for each of the different eminent values and the dots will be placed for the not null column values. The reference matrix can be adjusted or learned for all the rows which are entering into the model and then passed onto the table.

The reference matrix can be used to update a search request. When a search request is received with a search value that corresponds to one of the eminent values in the reference matrix, the operations discussed herein may be used to determine the columns that contain data relating to the search value and the NULL columns. As such, the number of columns to be searched can be reduced without affecting accuracy. The updated search request allows for only necessary columns to be searched, saving memory, processing power and execution time.

FIG. 1 provides a block diagram illustrating a system environment 100 for dynamically generating optimized data queries to improve hardware efficiency and utilization, in accordance with an embodiment of the present disclosure. As illustrated in FIG. 1, the environment 100 includes an optimized data query executor 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The optimized data query executor 300 is a system of the present disclosure for performing one or more process steps described herein. In some embodiments, the optimized data query executor 300 may be an independent system. In some embodiments, the optimized data query executor 300 may be a part of the entity system 200. For example, the method of FIGS. 6 and 7 may be carried out by the entity system 200, the optimized data query executor 300, the computing device system 400, and/or a combination thereof.

The optimized data query executor 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the optimized data query executor 300 is configured to communicate information or instructions with the entity system 200, and/or the computing device system 400 across the network 150. While the entity system 200, the optimized data query executor 300, and the computing device system 400 are illustrated as separate components communicating via network 150, one or more of the components discussed here may be carried out via the same system (e.g., a single system may include the entity system 200 and the optimized data query executor 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the optimized data query executor 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a data query execution application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the data query execution application 250, the one or more entity application 270 to perform certain logic, data-extraction, and data-storing functions of the entity system 200 described herein, as well as communication functions of the entity system 200.

The network server application 240, the data query execution application 250, and the one or more entity applications 270 are configured to store data in the data repository 280 or to use the data stored in the data repository 280 when communicating through the network communication interface 210 with the optimized data query executor 300, and/or the computing device system 400 to perform one or more process steps described herein. In some embodiments, the entity system 200 may receive instructions from the optimized data query executor 300 via the data query execution application 250 to perform certain operations. The data query execution application 250 may be provided by the optimized data query executor 300. The one or more entity applications 270 may be any of the applications used, created, modified, facilitated, and/or managed by the entity system 200.

FIG. 3 provides a block diagram illustrating the optimized data query executor 300 in greater detail, in accordance with various embodiments. As illustrated in FIG. 3, in one embodiment, the optimized data query executor 300 includes one or more processing devices 320 operatively coupled to a network communication interface 310 and a memory device 330. In certain embodiments, the optimized data query executor 300 is operated by an entity, such as a financial institution. In some embodiments, the optimized data query executor 300 is owned or operated by the entity of the entity system 200. In some embodiments, the optimized data query executor 300 may be an independent system. In alternate embodiments, the optimized data query executor 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the optimized data query executor 300 described herein. For example, in one embodiment of the optimized data query executor 300, the memory device 330 includes, but is not limited to, a network provisioning application 340, a data gathering application 350, a matrix generator 360, a data query generator 365, an artificial intelligence engine 370, a query executor 380, and a data repository 390 comprising any data processed or accessed by one or more applications in the memory device 330. The computer-executable program code of the network provisioning application 340, the data gathering application 350, the matrix generator 360, the data query generator 365, the artificial intelligence engine 370, and the query executor 380 may instruct the processing device 320 to perform certain logic, data-processing, and data-storing functions of the optimized data query executor 300 described herein, as well as communication functions of the optimized data query executor 300.

The network provisioning application 340, the data gathering application 350, the matrix generator 360, the data query generator 365, the artificial intelligence engine 370, and the query executor 380 are configured to invoke or use the data in the data repository 390 when communicating through the network communication interface 310 with the entity system 200, and/or the computing device system 400. In some embodiments, the network provisioning application 340, the data gathering application 350, the matrix generator 360, the data query generator 365, the artificial intelligence engine 370, and the query executor 380 may store the data extracted or received from the entity system 200, and the computing device system 400 in the data repository 390. In some embodiments, the network provisioning application 340, the data gathering application 350, the matrix generator 360, the data query generator 365, the artificial intelligence engine 370, and the query executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data query execution application 421, entity application 424. These applications also typically instructions to a graphical user interface (GUI) on the display 430 that allows the user 110 to interact with the entity system 200, the optimized data query executor 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the data query execution application 421 provided by the optimized data query executor 300 allows the user 110 to access the optimized data query executor 300. In some embodiments, the entity application 424 provided by the entity system 200 and the data query execution application 421 allow the user 110 to access the functionalities provided by the optimized data query executor 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Referring now to FIGS. 5 and 6, a system of an example embodiment may be configured to create and/or update a reference matrix for use in searching a database. FIG. 5 illustrates an example reference matrix 500 that may be created and/or updated based on the operations shown in FIG. 6. In various embodiments, the reference matrix is a dot matrix. For example, the reference matrix 500 is a wisdom dot matrix (WDM) compiled using machine learning based on the contents of a given table being inserted into a database. As such, the reference matrix 500 is an array used to represent information, namely the content of columns of the database.

As shown, reference matrix 500 is a reference matrix for an example table containing 6 columns (Columns c1 through c6). Column c1 and Column c2 are defined as eminent columns. In various embodiments, the table to be inserted may indicate which of the columns are eminent columns (e.g., using metadata to indicate which columns are eminent columns). Additionally or alternatively, the eminent columns of the table may be determined based on the database contents (e.g., the system may determine a column is an eminent column based on a similarity with an eminent column of another table already inserted).

Eminent columns c1 and c2 contain eminent values 560, 570, 580 (e.g., the eminent values are A, B, and C). Each of these eminent values may be an entry into one or both of the eminent columns c1 and c2. The number of rows in the reference matrix is based on the number of unique eminent values in the eminent column(s). For example, in an instance in which there are 10 unique eminent values in the eminent column(s), then the reference matrix may have 10 rows. The number of columns in the reference matrix 500 is based on the number of columns in the table. As shown, the number of columns in the reference matrix 500 is the same as the number of non-eminent columns in the table (e.g., columns 520, 530, 540, and 550 corresponds to columns c3, c4, c5, and c6, respectively). In various embodiments, one or more eminent columns (e.g., EC c1, c2 510) may also have a column in the reference matrix.

Each cell of reference matrix 500 indicates whether a given column contains data relating to a given eminent value. In the depicted reference matrix 500, the black dots indicate that a column contains data relating to a given eminent value, while a grey dot indicates that a column does not contain data relating to a given eminent value. As such, in an instance in which a search for one or more search value that corresponds to an eminent value (as discussed in reference to FIG. 7) is performed, the reference matrix 500 may be referenced to determine one or more columns that should be searched. For example, in an instance in which a search for eminent value A is performed, only columns c3 and c4 contain data relating to value A and therefore only columns c3 and c4 would need to be searched to obtain complete search results. Columns c4 and c5 contain data relating to eminent value B 570. Columns c3, c4, and c5 contain data relating to eminent value C 580. As such, the reference matrix 500 allows for more efficient data query processing.

Referring now to FIG. 6, a flowchart is provided illustrating a method of constructing a reference matrix of a table in accordance with various embodiments. The method discussed herein may be carried out by one or more of the components discussed in reference to FIG. 1. For example, the method may be carried out by the entity system 200 and/or the optimized data query executor 300.

Referring now to Block 600 of FIG. 6, the method may include receiving an insert request containing one or more tables to be inserted into a database. In some embodiments, as shown in Block 600, the method of FIG. 6 may be performed upon an initial insertion of a table into a database. In other embodiments, the analysis (e.g., the update or creation of the reference matrix) may be performed after a table has been inserted into the database. The table may be inserted using an SQL insert function. In various embodiments, the operations of FIG. 6 may be carried out on any new data to the given database (e.g., the method of FIG. 6 may be automatically carried out on any new data inserted into a database).

Referring now to Block 610 of FIG. 6, the method may include determining whether the table to be inserted has one or more eminent columns. The eminent column may be defined as one or more prominent columns that are most often searched on a table. In various embodiments, the table to be inserted may indicate which of the columns are eminent columns (e.g., using metadata to indicate which columns are eminent columns). Additionally or alternatively, the eminent columns of the table may be determined based on the database contents (e.g., the system may determine a column is an eminent column based on a similarity with an eminent column of another table already inserted). In an instance in which the table has one or more eminent columns, the operations of Block 620 through Block 640 are carried out as discussed herein. In an instance in which the table does not have one or more eminent columns, the table data is transmitted to the database without the operations of Block 620 through Block 640, and thus a reference matrix is not created, or updated.

Referring now to Block 620 of FIG. 6, the method may include creating or identifying a reference matrix relating to the contents of the table. Upon determination that a table has one or more eminent columns, the depicted method includes determining whether a reference matrix currently exists relating to the table and/or the database in which the table is to be inserted. A database may have a reference matrix for data previously entered into the database (e.g., a reference matrix may have already been created for a database based on a similar operation as discussed herein). Alternatively, a database may not yet have a reference matrix for data. The reference matrix may be embedded within the database (e.g., as metadata or the like). Alternatively, the reference matrix may be independent of, but refer to, the database. In some embodiments, the entire database may have a single reference matrix for the database. Additionally or alternatively, one or more individual tables without a database may have a separate reference matrix. In some embodiments, each of the one or more tables within a database may have a reference matrix.

In an instance in which a reference matrix does not yet exist, the method includes creating an empty reference matrix for use in the operations herein. The size of the reference matrix may be based on the size of the table to be inserted. In an example embodiment, the number of rows corresponds to the number of unique eminent values are present in the one or more eminent columns. For example, the reference matrix 500 of FIG. 5 has three unique eminent values A, B, and C in the eminent columns c1 and c2. Additionally, the number of columns in the empty reference matrix may be based on the number of columns in the table. For example, reference matrix 500 has 4 columns based on the number of non-eminent columns in the table in which the reference matrix was created. As discussed above, there may also be one or more columns based on one or more of the eminent columns.

In an instance in which a reference matrix exists or once the empty reference matrix has been created, the method includes updating the reference matrix using machine learning as detailed below in reference to Block 630.

Referring now to Block 630 of FIG. 6, the depicted method includes processing the table data using machine learning (e.g., artificial intelligence engine 370 of the optimized data query executor 300). In various embodiment, the machine learning may analyze one or more cells of the table to determine whether a given column contains data relating to a given eminent value. The reference matrix may have an element that corresponds to a given eminent value (along the row direction) and a given column of the table (along the column direction). The depicted method may use a machine learning algorithm and/or machine learning model to analyze the table in order to update the reference matrix. For example, the artificial intelligence engine 370 of the optimized data query executor 300 may process each row of the table based on the results of previous analysis (e.g., the analysis may begin by determining whether a given eminent value is already represented in the reference matrix).

Each element of the reference matrix may indicate whether a given column of a table contains data relating to the given eminent domain. For example, as shown in FIG. 5, the black dot elements indicate that a given table column contains data relating to the given eminent value. A column may have data relating to a given eminent value in an instance in which at least one cell in that given column that is in the same row as a cell containing the eminent value contains any data. For example, a table with information relating to user may include an eminent column with customer residence state, as well as a non-eminent column including additional information relating to the user (e.g., residence city). In an example embodiment, an element of the reference matrix may indicate that the non-eminent column contains data relating to the given user residence state in an instance in which a cell of the column contains any data in the same row as one of the cells with the eminent value (e.g., the given residence state included in the search request).

Referring now to Block 640 of FIG. 6, the depicted method includes updating the reference matrix based on the processed table data. In various embodiments, the updated reference matrix may be usable in searches, such as those discussed in reference to FIG. 7 below. The updated reference matrix may include information relating to one or more eminent values discussed herein.

Referring now to Block 650 of FIG. 6, the depicted method includes causing a transmission of the reference matrix and/or the table to the database. The transmission may be over a network (e.g., from entity system 200 to the optimized data query executor 300 over network 150) or locally (e.g., transmitted within the optimized data query executor 300).

Referring now to FIG. 7, a method of searching a database is provided. The method may be carried out by a system discussed herein (e.g., the entity system 200, the optimized data query executor 300, and/or the computing device system 400). An example system may include at least one non-transitory storage device and at least one processing device coupled to the at least one non-transitory storage device. In such an embodiment, the at least one processing device is configured to carry out the method discussed herein.

Referring now to Block 700 of FIG. 7, the method includes receiving a search request to perform a search operation associated with a database, wherein the search request includes one or more search values. The search request may be in the form of a Structured Query Language (SQL) based request. The search request may be a SQL SELECT query. The search request may be a parsed SQL SELECT query. The parsed SELECT query may include an EXCLUDE NULL clause. The EXCLUDE NULL clause may indicate that the system can remove cells from a search that contain NULL values. The parsed SELECT query may also include a where clause that includes the one or more search values. The search values of the SELECT query may correspond to one or more eminent values in the reference matrix (e.g., a reference matrix created or updated according to the operations of FIG. 6).

In some embodiments, the method may also include generating the reference matrix associated with the database (e.g., in an instance in which there is no reference matrix corresponding to the given database associated with the search request). In some embodiments, the reference matrix is generated as detailed in the operations of FIG. 6. In an example embodiment, generating the reference matrix includes identifying one or more database columns in the database. Generating the reference matrix also includes identifying at least one of the one or more database columns as an eminent column via a machine learning model with the at least one eminent column including one or more eminent values. Generating the reference matrix may further include determining if the one or more database columns comprise data corresponding to the one or more eminent values. Generating the reference matrix may still further include building one or more entries of the reference matrix based on determining if the one or more database columns of the database includes the data corresponding to the one or more eminent values. In such an embodiment, one or more entries of the reference matrix are based on a relationship between the one or more eminent values and the one or more database columns.

In various embodiments, the search request may be transmitted for execution without the operations of Blocks 710 through 730 (e.g., the search request may be transmitted to the optimized data query executor 300 for execution). For example, in an instance in which the search request is a SELECT query that does not include an EXCLUDE NULL clause, the search request may not be updated to identify any search columns and, as such, the search operation may be carried out on the entire database.

Referring now to Block 710 of FIG. 7, the method includes identifying one or more search columns of the database based on at least one of the one or more search values. The identification of the one or more search columns includes comparing the at least one of the one or more search values with a reference matrix. As discussed above, the reference matrix relates to contents of the database (e.g., providing an indication of the content of the columns within the database).

In various embodiments, the database includes one or more database columns. The database columns may be identified as search columns or non-search columns based on a given search request. The search columns may be defined as one or more columns in the database that contain data relating to the search value, while the non-search columns are any columns that do not contain data relating to the search value. In various examples, all of the database columns may be search columns in an instance in which all of the columns of the database include data relating to the search value. Alternatively, all of the database columns may be non-search columns in an instance in which none of the columns contain data relating to the search value. In some examples, a database may include one or more search columns for a given search value and one or more non-search column for the given search value. The non-search columns may contain NULL values in any cell corresponding to the given search value (e.g., any cell in the non-search column that is in the same row as a cell with the search value).

In various embodiments, the reference matrix may indicate which of the one or more database columns of the database contain data relating to one of the search values (e.g., which columns are search columns and which are non-search columns for a given eminent value). In various embodiments, at least one of the database columns is an eminent column. Each eminent column includes one or more eminent values. The reference matrix is based on a relationship between one or more eminent values and one or more database columns. The reference matrix may indicate whether a given database column contains data relating to a given eminent value. For example, as shown in FIG. 5, the black dot elements may indicate that a given column contains data relating to a given eminent value, while the grey dot elements may indicate that the given column does not contain data relating to the given eminent value.

In various embodiments, the identification of the one or more search columns includes determining which of the one or more search values correspond to one or more eminent values. For example, in an example embodiment, a search request may be received that includes a 'where' clause that includes a search value that corresponds to an eminent value contained within the reference matrix. In such an instance, the reference matrix may be used to identify the search columns that contain data relating to the search value. In an example, in an instance in which none of the search values correspond to an eminent value of the reference matrix, then the search request may not be updated before being transmitted.

Referring now to Block 720 of FIG. 7, the method includes updating the search request based on the one or more search columns identified. The updated search request may include the one or more search columns for the search value(s). For example, referring to the reference matrix 500 shown in FIG. 5, in an instance in which a search request includes a search value 'A' that corresponds to eminent value A 560, the search request may be updated to indicate that only columns c3 and c4 are search columns and therefore columns c5 and c6 do not have to be searched.

Referring now to Block 730 of FIG. 7, the method includes causing a transmission of the updated search request for performance of the search operation. The updated search request may be transmitted to an optimized data query executor 300, as shown in FIG. 1. The updated search request may be used to query the search columns of the database without requiring additional searching of the non-search columns. The updated search request allows for optimization of searching a database.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for searching a database, the system comprising:
   at least one non-transitory storage device; and
   at least one processing device coupled to the at least one non-transitory storage device, wherein the at least one processing device is configured to:
   receive a search request to perform a search operation on one or more database columns of a database, wherein the search request is a SELECT query that includes one or more search value and indicates the one or more database columns of the database to be searched, wherein the search request comprises a request to exclude one or more NULL columns from the one or more database columns to be searched;

identify one or more search columns of the one or more database columns of the database based on at least one of the one or more search values, wherein the identification of the one or more search columns comprises comparing the at least one of the one or more search values with a reference matrix, wherein the reference matrix relates to contents of the database;

update the SELECT query of the search request based on the one or more search columns identified, wherein the updated search request has removed the one or more NULL columns from the one or more database columns to be searched by the search request, wherein the updated search request indicates the one or more search columns to be searched; and cause a transmission of the updated search request for performance of the search operation, wherein the updated search request is the updated SELECT query that is capable of being performed on the database and indicates the one or more search columns to be searched, wherein the database includes each of the NULL columns after the search request is updated.

2. The system of claim 1, wherein the at least one processing device is configured to generate the reference matrix associated with the database, wherein generating the reference matrix comprises:

identifying one or more database columns in the database;

identifying at least one of the one or more database columns as an eminent column via a machine learning model, the at least one eminent column comprising one or more eminent values;

determining if the one or more database columns comprise data corresponding to the one or more eminent values; and building one or more entries of the reference matrix based on determining if the one or more database columns of the database comprises the data corresponding to the one or more eminent values, wherein the one or more entries of the reference matrix are based on a relationship between the one or more eminent values and the one or more database columns.

3. The system of claim 2, wherein each of the one or more entries of the reference matrix indicate whether a given database column contains data relating to a given eminent value.

4. The system of claim 2, wherein the identification of the one or more search columns comprises determining which of the one or more search values correspond to the one or more eminent values.

5. The system of claim 1, wherein the database comprises one or more database columns, wherein the one or more search columns includes each of the one or more database columns that contain data relating to one of the one or more search values.

6. The system of claim 5, wherein the reference matrix indicates which of the one or more database columns of the database contain data relating to one of the one or more search values.

7. The system of claim 1, wherein the one or more NULL columns contain a NULL value in each cell of the given NULL column.

8. A computer program product for searching a database, the computer program product comprising at least one non-transitory computer-readable medium having computer-readable program code portions embodied therein, the computer-readable program code portions comprising:

an executable portion configured to receive a search request to perform a search operation on one or more database columns of a database, wherein the search request is a SELECT query that includes one or more search value and indicates the one or more database columns of the database to be searched, wherein the search request comprises a request to exclude one or more NULL columns from the one or more database columns to be searched;

an executable portion configured to identify one or more search columns of the one or more database columns of the database based on at least one of the one or more search values, wherein the identification of the one or more search columns comprises comparing the at least one of the one or more search values with a reference matrix, wherein the reference matrix relates to contents of the database;

an executable portion configured to update the SELECT query of the search request based on the one or more search columns identified, wherein the updated search request has removed the one or more NULL columns from the one or more database columns to be searched by the search request, wherein the updated search request indicates the one or more search columns to be searched; and an executable portion configured to cause a transmission of the updated search request for performance of the search operation, wherein the updated search request is the updated SELECT query that is capable of being performed on the database and indicates the one or more search columns to be searched, wherein the database includes each of the NULL columns after the search request is updated.

9. The computer program product of claim 8, wherein the computer-readable program code portions further comprise an executable portion configured to generate the reference matrix associated with the database, wherein generating the reference matrix comprises:

identifying one or more database columns in the database;

identifying at least one of the one or more database columns as an eminent column via a machine learning model, the at least one eminent column comprising one or more eminent values;

determining if the one or more database columns comprise data corresponding to the one or more eminent values; and building one or more entries of the reference matrix based on determining if the one or more database columns of the database comprises the data corresponding to the one or more eminent values, wherein the one or more entries of the reference matrix are based on a relationship between the one or more eminent values and the one or more database columns.

10. The computer program product of claim 9, wherein the reference matrix indicates whether a given database column contains data relating to a given eminent value.

11. The computer program product of claim 9, wherein the identification of the one or more search columns comprises determining which of the one or more search values correspond to the one or more eminent values.

12. The computer program product of claim 8, wherein the database comprises one or more database columns, wherein the one or more search columns includes each of the one or more database columns that contain data relating to one of the one or more search values.

13. The computer program product of claim 12, wherein the reference matrix indicates which of the one or more database columns of the database contain data relating to one of the one or more search values.

14. The computer program product of claim 8, wherein the one or more NULL columns contain a NULL value in each cell of the given NULL column.

15. A computer-implemented method for searching a database, the method comprising:
- receiving a search request to perform a search operation on one or more database columns of a database, wherein the search request is a SELECT query that includes one or more search value and indicates the one or more database columns of the database to be searched, wherein the search request comprises a request to exclude one or more NULL columns from the one or more database columns to be searched;
- identifying one or more search columns of the one or more database columns of the database based on at least one of the one or more search values, wherein the identification of the one or more search columns comprises comparing the at least one of the one or more search values with a reference matrix, wherein the reference matrix relates to contents of the database;
- updating the SELECT query of the search request based on the one or more search columns identified, wherein the updated search request has removed the one or more NULL columns from the one or more database columns to be searched by the search request, wherein the updated search request indicates the one or more search columns to be searched; and
- causing a transmission of the updated search request for performance of the search operation, wherein the updated search request is the updated SELECT query that is capable of being performed on the database and indicates the one or more search columns to be searched, wherein the database includes each of the NULL columns after the search request is updated.

16. The computer-implemented method of claim 15, further comprising generating the reference matrix associated with the database, wherein generating the reference matrix comprises:
- identifying one or more database columns in the database;
- identifying at least one of the one or more database columns as an eminent column via a machine learning model, the at least one eminent column comprising one or more eminent values;
- determining if the one or more database columns comprise data corresponding to the one or more eminent values; and
- building one or more entries of the reference matrix based on determining if the one or more database columns of the database comprises the data corresponding to the one or more eminent values, wherein the one or more entries of the reference matrix are based on a relationship between the one or more eminent values and the one or more database columns.

17. The computer-implemented method of claim 16, wherein the reference matrix indicates whether a given database column contains data relating to a given eminent value.

18. The computer-implemented method of claim 16, wherein the identification of the one or more search columns comprises determining which of the one or more search values correspond to the one or more eminent values.

19. The computer-implemented method of claim 15, wherein the database comprises one or more database columns, wherein the one or more search columns includes each of the one or more database columns that contain data relating to one of the one or more search values, wherein the reference matrix indicates which of the one or more database columns of the database contain data relating to one of the one or more search values.

20. The method of claim 15, wherein the one or more NULL columns contain a NULL value in each cell of the given NULL column.

\* \* \* \* \*